C. M. GREY.
STEERING WHEEL LOCK FOR MOTOR VEHICLES.
APPLICATION FILED NOV. 22, 1920.
1,424,353.
Patented Aug. 1, 1922.
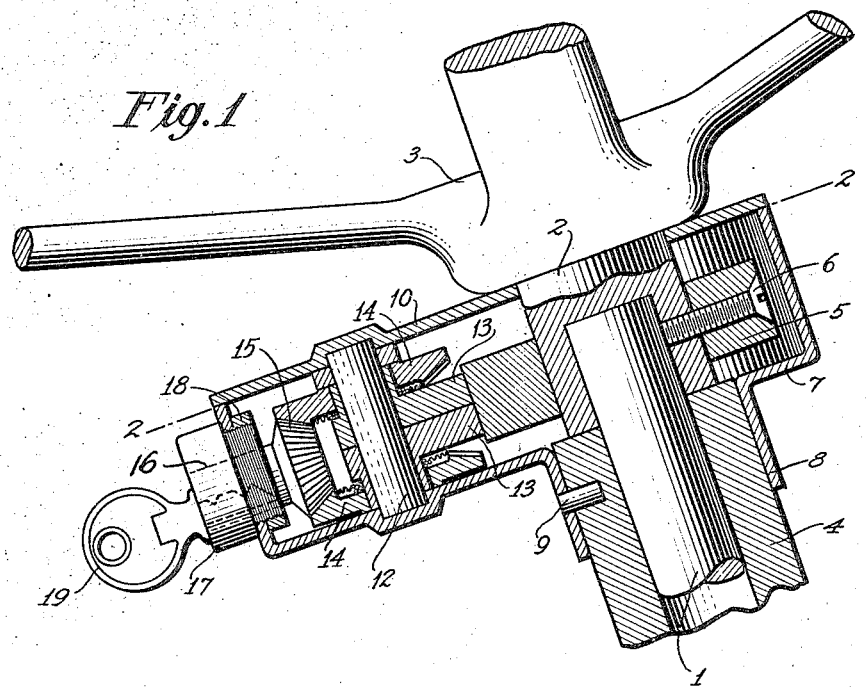
Fig.1
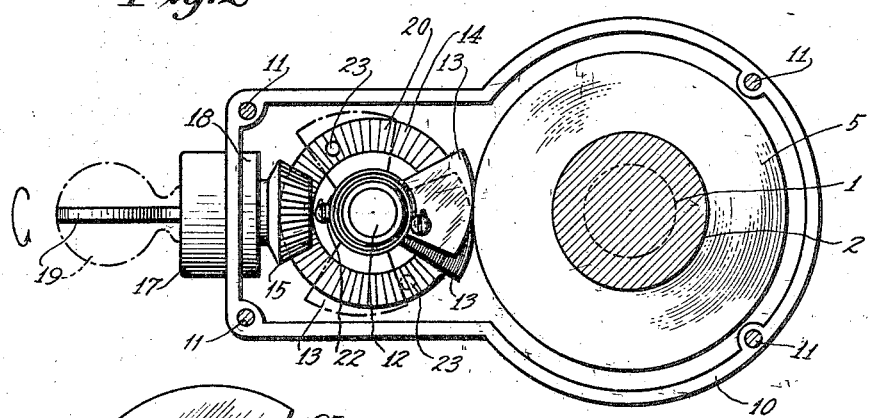
Fig.2
Fig.3
INVENTOR
Charles M. Grey
BY
Jas. H. Griffin
ATTORNEYS

UNITED STATES PATENT OFFICE.

CHARLES M. GREY, OF EAST ORANGE, NEW JERSEY.

STEERING-WHEEL LOCK FOR MOTOR VEHICLES.

1,424,353.     Specification of Letters Patent.     Patented Aug. 1, 1922.

Application filed November 22, 1920. Serial No. 425,639.

*To all whom it may concern:*

Be it known that I, CHARLES M. GREY, a citizen of the United States, residing at East Orange, county of Essex, and State of New Jersey, have invented a certain new and useful Steering-Wheel Lock for Motor Vehicles, of which the following is a specification.

This invention relates to locks and is directed, more particularly, to a device for locking the steering wheel of a motor vehicle against operation at such times as the driver may desire to leave the vehicle alone and unoccupied, whereby unauthorized parties are precluded from stealing or surreptitiously using the same.

The object of the present invention is to provide a device of the character specified which is simple in construction, efficient in operation, and which is capable of being manufactured at a relatively small cost.

Speaking generally, the invention, in its broad aspect, embodies a pair of cam members, or their equivalents, which are adapted to simultaneously engage or disengage some rotatable part of the steering mechanism of a car, to lock the same against rotation, or to permit operation of the same, depending upon the position of the cam members with reference to the said rotatable part.

With the cam members is preferably associated means for locking them in unlocked position in order to preclude inadvertent shifting of such members into locking positions during the normal operation of the car. The cam members are preferably manually operable through the instrumentality of a key or permutation lock whereby their operation by unauthorized persons is precluded.

Features of the invention, other than those specified, will be apparent from the hereinafter detail description and claims, when read in conjunction with the accompanying drawings.

The accompanying drawings illustrate one practical embodiment of the present invention, but the construction therein shown is to be understood as illustrative, only, and not as defining the limits of the present invention.

Figure 1 is a side elevation of the upper end of a steering spindle, showing the steering column in section, the hub of the steering wheel partially in section and the steering wheel broken away and in conjunction with these parts, a lock embodying the present invention as illustrated in central section.

Figure 2 is a section on the line 2—2 of Figure 1; and,

Figure 3 is a plan view of one of the bevel gears employed, said gear being broken away to show a segmental cam which is associated therewith and a spring by means of which the cam is normally forced into locking position.

Referring to the drawings, 1 designates the steering spindle of a motor vehicle to the upper end of which is secured the hub 2 of a steering wheel 3 of any conventional form. The steering spindle 1 is housed within a steering column 4. These parts differ slightly in shape in different cars, but are usually present in some form or other.

The present invention in its preferred form embodies a cylindrical member 5, adapted to be secured in any suitable manner to the hub 2 of the steering wheel. As shown, this member is secured to the hub by means of a screw 6 which passes through the member 5, threads into the hub 2 and bears against the upper end of the steering spindle 1, so that the member 5 and hub 2 are simultaneously locked to the steering spindle 1, so that all of these parts will rotate in unison when the steering wheel is operated. The member 5 bears a relation to the hub as a collar and will be hereinafter referred to as such. It is preferable, in carrying out the present invention that the hub 2 be provided with such a collar although if desired this element may be omitted and the locking elements of the device cooperate directly with the hub 2 of the steering wheel.

A casing 7 is provided which may be formed of sheet metal, die cast or otherwise and is provided with a cylindrical boss adapted to embrace the upper end of the steering column and be rigidly locked thereon and against rotation relative thereto by means of a pin 9 driven through a hole in the side of the boss and entering a depression in the steering column as clearly shown in Figure 1. The casing 7 is provided with a suitable cover 10 for housing the locking mechanism within the casing and this cover may be normally held in place by any suitable means, but, as shown, is riveted on by means of four rivets 11, which pass through the casing from top to bottom and are riveted over at both the top and bottom of the casing so that the cover is normally locked against surreptitious removal.

Extending vertically through the casing and mounted in the top and bottom walls thereof is a pin 12 on which two segmental cams 13 are mounted for rotation. These segmental cams are clearly shown in the drawings and their outer faces are cam shaped in such manner that when in the position shown in Figure 2, both of them will engage with the collar 5 about midway of their cam surfaces and such cam surfaces are curved in opposite directions, so that they are adapted to approach and grip the circumference of the collar 5 when they are moved toward one another.

Mounted on the hub of each segmental cam is a beveled gear 14 adapted for free rotation on the hub of such cam and both of which beveled gears engage with a bevel pinion 15, which is, in turn, carried by a plug or rotatable barrel 16 of a lock 17. The escutcheon cylinder of the lock is reduced for a portion of its length and the reduced portion is threaded whereby it is adapted to be passed through an aperture in the end of the casing and receive a nut 18, whereby said cylinder may be rigidly secured to the casing. A key 19 is adapted to cooperate with the rotary barrel of the lock and, when this key is operated, the rotary barrel 16 may be turned to rotate the pinion 15 and impart rotary movement to both bevel gears 14 simultaneously and in opposite directions.

Each cam 13 is connected to its adjacent bevel gear 14 by means of a spring 20, one end of which spring is secured by a screw 21 to the cam 13 and the other end of which spring is secured by a screw 22 to the adjacent bevel gear 14. These coil springs are so constituted that they will exert tension on the cams so that when the gears 14 are held stationary by the pinion 15, the springs 20 will serve to impel the cams in a direction to engage with the periphery of the collar 5. Each gear is, however, provided at its inner face with a pin 23, which projects into a position to engage with one of the radial faces or edges of the corresponding cam.

The springs 20 normally force the cams into engagement with the collar 5 and when the cams thus engage with the collar one cam will preclude rotation of the collar in one direction while the other cam will preclude rotation of the collar in another direction. However, by virtue of the pins 23, the key may be rotated so as to bring the pins into engagement with the edges of the cams, whereupon a further rotation of the gears by the key will cause the pins to retract the cams against the tension of their springs and move them out of engagement with the collar 5, thereby enabling the collar to be freely rotated and consequently permitting of unrestricted operation of the steering wheel. The parts are so constituted that when the cams have been retracted into their fully retracted position, the key 19 will be in such position that it may be readily withdrawn from the plug or rotary barrel of the lock, whereupon as is common in locks of the character shown, the tumblers of the lock will lock the rotary barrel against rotation and in so doing will lock the bevel pinion 18 against movement and consequently lock the cams in their retracted position so that they cannot inadvertently be forced back into locking position by their springs when the structure is vibrated through the operation of the car. However, when it is desired to lock the steering wheel, the key may be reinserted and turned to allow the springs 20 to function to the end that the cams 13 may engage with the collar 5 and preclude rotation thereof in either direction. The key may now be withdrawn, leaving the steering wheel locked so that the car operator may safely leave the car without fear of it being stolen or surreptitiously operated during his absence.

It will be noted from the foregoing description that the device of the present invention is extremely simple, embodies a minimum number of operating parts and may be manufactured at a coparatively low cost. Moreover, it may be installed in a simple and efficient manner by associating the parts on the steering column and on the hub before riveting down the cover as will be apparent to any mechanic skilled in the art.

As heretofore stated, the collar 5 may be omitted and the cams 13 may operate directly with the hub 2. I am aware, moreover, that the lock of the present invention while particularly adapted for locking the steering wheel against operation is also capable of employment in other environments. For example, it may be used with considerable success to lock the pivotal portion of a windshield against rotation. In fact, the lock of this invention may be employed wherever it is desired to lock any normally rotatable part against rotation.

I am further aware that the relation of the parts of this invention may be reversed. That is to say, instead of locking the wheel against rotation, the part 5 could be rigidly attached to the part 1, and the complete lock mounted in the frame or hub of the steering wheel. In this event, the locking elements 13 would be caused to lock the wheel to the steering spindle 1 when it is desired to drive the car and will be retracted to allow of idle rotation of the steering wheel when it is desired to leave the car alone.

It will be understood that the specific invention described may be modified in formal respects, such as by the substitution of equivalents, and that parts of the complete mechanism described may be used alone, or in other environments, without departing from the spirit or substance of the broad invention, the scope of which is commensurate with the appended claims.

Having thus fully described the invention, what I claim as new and desire to secure by Letters Patent is:

1. A lock embodying a rotatable member provided with a smooth, circular periphery, means cooperable with the smooth, circular periphery of said member for locking it against rotation in both directions, and means for positively precluding inadvertent operation of the locking means.

2. A lock embodying a rotatable member, two separable cam members adapted to cooperate with the peripheral surface of the rotatable member, one of said separable members being operable to preclude rotation of the rotatable member in one direction and the other of said separable members being adapted to preclude rotation of the rotatable member in the opposite direction.

3. A lock embodying a rotatable member, two pivotal locking members adapted to cooperate with the peripheral surface of the rotatable member, one of said locking members being operable to preclude rotation of the rotatable member in one direction and the other of said locking members being adapted to preclude rotation of the rotatable member in the opposite direction, said locking members being cam shaped whereby any attempt to force the rotatable member to rotate will cause said locking members to grip the rotatable member tighter.

4. A lock embodying a rotatable member, two pivotal cam shaped locking members, means for impelling the locking members into engagement with the periphery of the rotatable member, whereby one of said locking members locks the rotatable member against rotation in one direction while the other of said locking members locks the rotatable member against rotation in the other direction, and means for retracting the locking members to move them free from engagement with the rotatable member to permit free rotation of said rotatable member.

5. A lock embodying a rotatable member, two pivotal cam shaped locking members, means for impelling the locking members into engagement with the periphery of the rotatable member, whereby one of said locking members locks the rotatable member against rotation in one direction while the other of said locking members locks the rotatable member against rotation in the other direction, and key controlled means for retracting the locking members for engagement with the rotatable member to permit of free rotation of the rotatable member.

6. A lock embodying a rotatable member, two pivotal cam shaped locking members, means for impelling the locking members into engagement with the periphery of the rotatable member, whereby one of said locking members locks the rotatable member against rotation in one direction while the other of said locking members locks the rotatable member against rotation in the other direction, and key controlled means for retracting the locking members for engagement with the rotatable member to permit of free rotation of the rotatable member, said key controlled means embodying mechanism for locking the said locking members in retracted position to preclude inadvertent engagement with the rotatable member.

7. A lock embodying a rotatable member, two segmental cams mounted on a common pivot, means for impelling the cams in opposite directions to bring them simultaneously into engagement with the rotatable member at opposite sides of a plane passing through the axis of rotation of the rotary member and the axis of the pivot on which the segmental cams are mounted, whereby one of said cams locks the rotatable member against rotation in one direction and the other cam locks the rotatable member against rotation in the opposite direction, and means for retracting the segmental cams from engagement with the rotatable member to permit of further rotation of the rotatable member.

8. A lock embodying a rotatable member, two segmental cams mounted on a common pivot, means for impelling the cams in opposite directions to bring them simultaneously into engagement with the rotatable member at opposite sides of a plane passing through the axis of rotation of the rotary member and the axis of the pivot on which the segmental cams are mounted, whereby one of said cams locks the rotatable member against rotation in one direction and the other cam locks the rotatable member against rotation in the opposite direction, and key controlled means for retracting the segmental cams from engagement with the rotatable member to permit of free rotation of the rotatable member, said key controlled means embodying mechanism for locking the cams in retracted position to preclude their inadvertent engagement with the rotatable member.

9. A lock for locking a rotatable member against rotation embodying means, adapted to frictionally engage the rotatable member for precluding rotation of said member in one direction, means adapted to frictionally engage the rotatable member for precluding rotation of said member in the opposite direction, and means for simultaneously controlling the movement of said members into and out of locking engagement with the rotatable member.

10. A lock embodying a rotatable member provided with a smooth, cylindrical periphery, and means adapted to engage with the smooth, cylindrical periphery of said member to frictionally lock it against rotation in both directions.

11. A lock embodying a rotatable member provided with a smooth, cylindrical periphery, means adapted to engage with the smooth, cylindrical periphery of said member to frictionally lock it against rotation in both directions, and means for shifting the locking means into and out of engagement with the rotatable member.

12. A lock embodying two members, and means mounted on one of said members and adapted to frictionally engage with the other to lock them against rotation relative to one another and when disengaged to permit of relative rotation between said members.

13. A lock embodying two members, and means mounted on one of said members and adapted for frictional engagement with the other member to lock the members against rotation relative to one another in at least one direction and to permit of rotation of one member relative to the other in both directions when disengaged.

14. A steering wheel lock embodying a steering post, a casing associated therewith, a spindle positioned within the casing and in substantially parallel relation to the steering post, a pair of locking members pivotally mounted on the spindle and having curved peripheries adapted to engage with the steering spindle associated with the steering post, said curved peripheries being curved eccentric to the axis of the spindle and associated with one another in reversed relation, and means for pivotally moving the locking members into parallel engagement with the steering spindle to preclude rotation of the spindle in either direction and to also retract the locking members from engagement with the spindle to permit a free rotation of the spindle.

In testimony whereof, I have signed my name to this specification.

CHARLES M. GREY.